United States Patent [19]

Stratmann et al.

[11] 4,151,082
[45] Apr. 24, 1979

[54] SETTLING UNIT FOR CIRCULATED COKE QUENCHING WATER

[75] Inventors: Josef Stratmann; Manfred Strobel, both of Recklinghausen, Fed. Rep. of Germany

[73] Assignee: Firma Carl Still Recklinghausen, Fed. Rep. of Germany

[21] Appl. No.: 853,298

[22] Filed: Nov. 21, 1977

[30] Foreign Application Priority Data

Nov. 25, 1976 [DE] Fed. Rep. of Germany ... 7637032[U]

[51] Int. Cl.² ...................... B01D 21/18; B01D 21/24
[52] U.S. Cl. ........................................ 210/83; 210/527
[58] Field of Search ................ 210/83, 523, 524, 525, 210/527; 239/184, 185

[56] References Cited

U.S. PATENT DOCUMENTS

| 633,040 | 9/1899 | Reed | 210/523 X |
| 1,773,479 | 8/1930 | Escher | 210/523 |
| 3,859,799 | 1/1975 | Jaco, Jr. | 210/83 X |
| 3,868,323 | 2/1975 | Fux | 210/527 X |
| 3,988,211 | 10/1976 | Lewandowski et al. | 239/185 X |

FOREIGN PATENT DOCUMENTS

333625 2/1921 Fed. Rep. of Germany ........... 210/527

Primary Examiner—William A. Cuchlinski, Jr.
Attorney, Agent, or Firm—McGlew and Tuttle

[57] ABSTRACT

A settling unit for coke quenching water, which is circulated in a closed cycle, comprises a settling basin having substantially vertical side walls with a drain surface sloping downwardly alongside one of the sidewalls and a conduit for the quenching water disposed between the drain and the sidewall in a position to supply quenching water to the settling basin along the entire width of the sidewall and also to receive drained water from the drain surface. A trackway is defined above the basin and the drain surface and it includes a dredging carriage which is movable therealong having a dredging bucket which may be manipulated to pick up the solids from the basin or from the drain surface and to deposit them on the drain surface as necessary.

6 Claims, 3 Drawing Figures

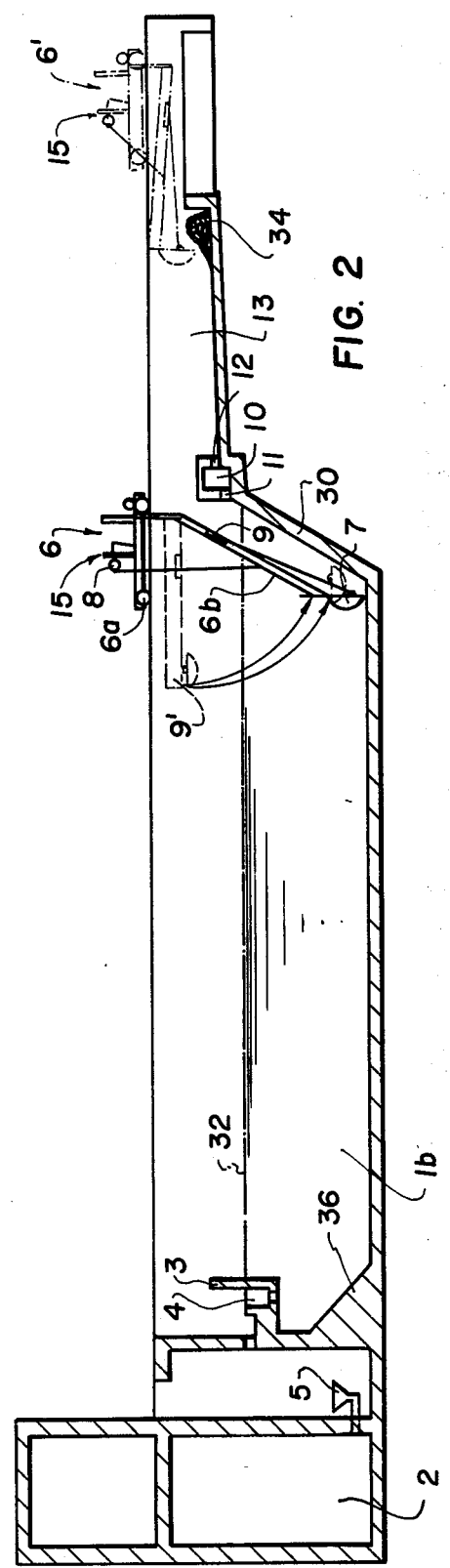

SETTLING UNIT FOR CIRCULATED COKE QUENCHING WATER

FIELD AND BACKGROUND OF THE INVENTION

This invention relates in general to the construction of coke ovens and, in particular, to a new and useful settling unit for circulated coke oven quenching water.

DESCRIPTION OF THE PRIOR ART

At the present time, apparatus for settling circulated coke quenching water are known which include vertical longitudinal walls and sloping transverse walls and are provided with sludge-treating means which include a slightly sloping head wall, the length of which is equal to, or greater than, the bottom of the settling basin. A removing mechanism for the settled sludge for such devices comprises a scuffler. The scuffler may be mounted for lifting and lowering by means of a mechanism which is supported on a carriage traveling above and along the basin and the plant may comprise two settling basins located side-by-side with a central feed channel and filtering units and water tanks at both sides thereof as described in German Utility Model No. 193,226.

While operating such plants, it has been found that in the area of the sloping head wall, the clarifying effect is small. This means that a larger surface area is required and much power is necessary to move the blade of the scuffler loaded with the coke sludge up the sloping wall to the drain surface. In the course of this motion, considerable frictional forces are to be overcome whereby the removers are highly stressed. In addition, the draining of the sludge removed from the settling basin on the drain surface becomes difficult due to the fact that the sludge can only be removed sequentially; that is, the fresh, wet sludge just removed is deposited ahead of, or over, the older and partly dried sludge which has been removed earlier. With such an arrangement, the older, already drained sludge is repeatedly wetted again by the water draining from the overlying fresh sludge.

In addition, in the construction of the settling basin of the prior art, the water coming from the quenching tower and containing coke fines and coke dust can be introduced into the settling basin only from the longitudinal sides thereof and this may cause turbulences making the settling difficult. Moreover, the construction tends to form horizontal streams which have unequal velocities and this results in an irregular setting of the sludge.

SUMMARY OF THE INVENTION

The present invention provides a settling unit for circulated coke quenching water in which the surfaces are better utilized and the power necessary for lifting the sludge is relatively small. In addition, the sludge which is removed is not repeatedly wetted again by subsequently removed sludge and the silty water to be clarified flows in regularly, without turbulences.

The construction of the invention includes a settling basin provided with substantially vertical, or only slightly inclined sidewalls. The inlets for the coke quenching water to be clarified are distributed along the entire width of the sidewalls and the basin is equipped with a remover which comprises a dredger bucket-like carriage which is mounted for movement along a trackway and which includes a pivotal shovel which may be adjusted upwardly and downwardly.

The invention makes it possible to introduce the silty water uniformly along the entire width of the settling basin and, thereby, to obtain a uniform settling of the sludge. Since a substantial part of the inclined surfaces is omitted, the settling basin has a high settling efficiency.

The remover which is carried for movement on a carriage along the trackway includes a dredger bucker device in the form of a pivotal shovel. With this shovel, it is possible to raise the sludge out of the basin and to deposit it along the drain surface by hoisting it along the side edge to the drain surface. With the construction, the friction to be overcome is reduced. In addition, it is possible to arrange the sludge on the drain surface so that the predried sludge will not be repeatedly wetted by the water draining from the subsequently deposited sludge. The shovel is provided with an upper portion made of a perforated sheet metal, forming a screen. As soon as the shovel is filled with a sludge, it is lifted above the surface level of the wetting basin and held for sometime in this position and a part of the water can drain or drip off into the basin in advance before the sludge is deposited on the drain surface.

Accordingly, it is an object of the invention to provide an improved device for treating water which has been used for the quenching of coke which includes a coke basin having at least one sidewall which is substantially vertical and which has a drain surface alongside it which slopes downwardly to the sidewall and which includes a conduit for supplying quenching water over the entire width of the basin and a sludge remover in the form of a dredger shovel which is carried on a carriage and which may be manipulated to remove the sludge from the bottom of the basin and to advantageously hold it so that the water drains therefrom through openings in the bucket or shovel and then it is deposited on the drain for further draining of the water backwardly to the basin.

A further object of the invention is to provide a method of treating sludge water which comprises directing it into a sludge basin by a stream directed across the entire width of the basin, permitting the sludge to settle in the basin, and regularly removing a portion of the sludge by lifting it upwardly adjacent a sidewall thereof and transferring it over the wall onto a drain surface permitting the water to drain from the sludge along the drain surface back into the basin.

Another object of the invention is to provide a coke quenching water treatment device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings

FIG. 2 is a sectional view taken along the line I—I of FIG. 1; and

DESCRIPTION OF THE PREFERRED EMBODIMENT

Figure 1:
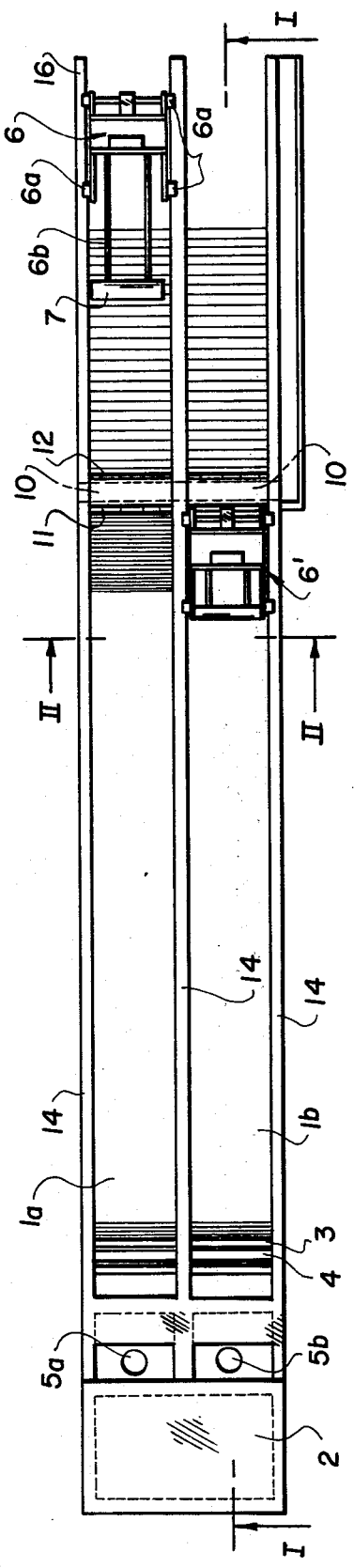
FIG. 1 is a top plan view of a coke quenching water settling device constructed in accordance with the invention.
Figure 3:
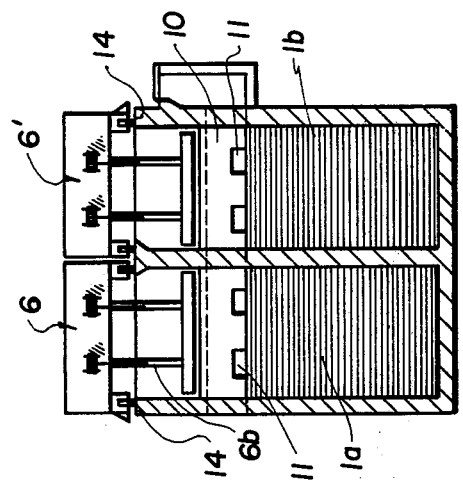
FIG. 3 is a sectional view taken along the line II—II of FIG. 1.

Referring to the drawings in particular, the invention embodied therein, comprises a settling unit for coke quenching water which in the embodiment shown, comprises two basins 1a and 1b having longitudinally elongated sidewalls on each side and an end wall at each end which are substantially vertical. In accordance with the invention, water which has been used to quench coke is directed together with the coke fines and coke dust which is suspended therein through a conduit 10 which extends transversely to an associated sidewall 30. In accordance with a feature of the invention, the conduit 10 is defined by a wall side having a laterally elongated inlet opening 11 which extends the complete width of the basin 1b and is located so that the quenched water will pour out in a stream over the top of wall 30 and into the basin 1a and 1b where the sludge in the water may settle.

In accordance with a further feature of the invention, a trackway comprising individual track elements 14, 14, 14 is defined over the respective basins 1a and 1b and carriages 6 and 6' for coke fine removers have wheels 6a which are guided over the respective trackways. Carriages 6 and 6' carry solids-remover equipment, generally designated 15, which includes a pivotal support arm 9 which is adjustable in length and which carries a shovel 7 at its lower end which is pivotally mounted so that it may be shifted from a vertical position, shown in solid lines in FIG. 2 to a horizontal position. A portion of the shovel is formed with a perforated sheet so that when sludge is removed from the bottom of a basin, such as the basin 1b as shown in FIG. 2, it may be raised above the water level 32 and permitted to drain so as to remove a portion of the water content back into the basin.

After the bucket is raised to a dotted line position of the arm indicated at 9', the carriage may be moved to a position at which it is above the drain surface 13 which slopes downwardly toward the conduit 10 and toward the basins 1a and 1b. The conduit 10 is provided with a drain opening 12 along its width to receive the water which is drained away from the solids 34 which are deposited on the drain surface. Additional piles of solids may be placed on the drain surface 13 in piles alongside the pile 34 in a direction toward the drain opening 12 and the water therefrom will drain in a direction away from the first pile which was deposited at 34. The shovel 7 may be manipulated by adjustment of the cable control 8 to both raise and lower the arm or to extend the arm 9 into adjusted position of the shovel 7.

The apparatus shown in the drawings also includes a machine room 2. A weir 3 is located adjacent an opposite end edge 36 of basin 1a and 1b. In addition, a coke filter 4 is located on the opposite side of the weir 3 from the water. Inlet connections 5a and 5b for the circulating pumps are located adjacent the machine room 2.

While a specific embodiment of the invention has been shown and described in detail to illustrate the application of the principles of the invention, it will be understood that the invention may be embodied otherwise without departing from such principles.

What is claimed is:

1. A settling unit for coke quenching water which is circulated in a closed cycle, comprising at least one substantially rectangular longitudinally elongated settling basin having a flat bottom, substantially vertical side walls on each side, one first end wall, and a second end wall on the opposite end from said first end wall being slightly inclined from the vertical, a drain surface alongside and sloping toward said second end wall, conduit means adjacent said second end wall having a discharge coextensive in length with said second end wall for directing coke fines and coke dust suspended in a quenching water downwardly on said second end wall into said basin along the entire width of said second end wall and said basin, a trackway extending along the length of said basin and overlying said basin and said drain surface, a dredger carriage movable along said trackway, a support arm pivoted to said dredger carrier and extending downwardly into said basin to a location adjacent the bottom thereof, a bucket pivotally mounted on said arm and being engageably along the bottom upon movement of said carriage to scrape the solids collected in the basin along said bottom of said second end wall and to said drain surface.

2. A settling unit, as claimed in claim 1, including first and second basins arranged alongside each other, each having a drain surface adjacent an associated sidewall second end wall, said carriage having a bucket which is engageable into each of said basins.

3. A settling unit according to claim 1, wherein said bucket includes a shovel member having a perforated cheek portion permitting draining of the water from the solids which are removed from the settling basin during the movement of the solids thereby upwardly along said second end wall above the liquid level in said basin and to said drain surface.

4. A settling unit according to claim 1 wherein said bucket includes a screen portion for draining the water therefrom, said conduit means comprising a conduit extending along the length of said second end wall adjacent the top thereof and having one side thereof disposed across the length of said basin with an opening therein for receiving water drained from said basin and an opposite side disposed toward said basin with an opening thereof for draining the water into said basin.

5. A settling unit according to claim 1 including a weir adjacent said first end wall having a weir wall over which the liquid in said basin is flowable, a coke filter directly adjacent said weir wall on the side thereof opposite to said basin, and an overflow tank connected to said coke filter.

6. A method of treating a quenching water after it is used to quench coke for recirculating back for use in quenching additional coke, using a basin having an end wall with a shovel movable along the end wall to scrape the solids out of the basin and dump them on a drain alongside the end wall of the basin, and a conduit arranged adjacent the end wall comprising discharging the quenching water containing solids and water through the conduit along the entire length of the conduit over the end wall and into the basin, continuously removing the solids from the basin by dragging the solids along the bottom of the basin and up the end wall and depositing the solids with any liquid removed from the basin on a drain which drains back into the conduit, permitting the liquid to drain into the conduit and then flow backwardly into the basin and continuously remove the solids which accumulate on the drain after the liquid has run off the solids.

* * * * *